United States Patent [19]

Shinn

[11] Patent Number: 5,268,798

[45] Date of Patent: Dec. 7, 1993

[54] METHOD FOR DETECTING THE START OF DATA FIELD IN A RECORDING MEDIUM BY DETECTING THE SEQUENCE OF BIT CODES

[75] Inventor: Charles E. Shinn, Boise, Id.

[73] Assignee: Hewlett-Packard Company, Palo Alto, Calif.

[21] Appl. No.: 23,307

[22] Filed: Feb. 24, 1993

Related U.S. Application Data

[62] Division of Ser. No. 642,981, Jan. 10, 1991, Pat. No. 5,243,471.

[51] Int. Cl.$^5$ ............................................. G11B 5/09
[52] U.S. Cl. ....................................... 360/48; 360/40
[58] Field of Search .................. 360/48, 49, 50, 51, 360/40; 369/59, 48

[56] References Cited

U.S. PATENT DOCUMENTS 5,172,380 12/1992 Odaka ................................ 360/48
5,200,864 4/1993 Dunn et al. ...................... 360/48

Primary Examiner—Robert J. Pascal
Assistant Examiner—Tan Dinh
Attorney, Agent, or Firm—E. F. Oberheim

[57] ABSTRACT

A memory system having a moving memory recording media. A sector in each track on the media includes recordings defining a synchronizing field and a start of data field. Selected bit signals of bit signals derived from the recordings are simultaneously combined in a plurality of differing bit signal combinations. The simultaneously validity of all of the bit signals in each of a predetermined number of the differing bit signal combinations, which predetermined number is less than the plurality of bit signal combinations, provides fault tolerant detection of the start of data field.

4 Claims, 5 Drawing Sheets

__5,268,798__

METHOD FOR DETECTING THE START OF DATA FIELD IN A RECORDING MEDIUM BY DETECTING THE SEQUENCE OF BIT CODES

RELATED APPLICATION

This application is a division of the applicant's co-pending application S/N 07/642,981, filed on 1/10/91 is now U.S. Pat. No. 5,243,471.

TECHNICAL FIELD

This invention relates generally to methods and apparatuses providing fault tolerance in reading codes recorded on moving recording media such as a tape or a disk in a memory system.

BACKGROUND OF THE INVENTION

Memory systems, optical or magnetic, have moving recording media on which information is recorded in sections or sectors. These information sections must be accessible so that desired information can be read therefrom. Accessibility is achieved by providing header sections of discrete recordings on the moving media ahead of these information sections, defining fields of bit code patterns, forming synchronizing fields, start of information or data fields, referred to as start of data marks, together with data address fields, which together contain information for providing timed access to the recorded information or data. These fields comprise recordings on the media in the form of bits, such as magnetic dibits on magnetic media, which are transduced as the media moves past a transducer disposed adjacent the surface of the media. The transducer is optically or magnetically coupled to the recorded bits on the media. The bits on magnetic media are serially recorded in patterns of transition and non-transition magnetic dibits. The magnetic media surface is usually of one state of magnetic polarization, which when read (transduced) within the clock pulse intervals (bit times), provides electrical indications which characterize the non-transition bits. Transition bits are oppositely magnetically poled from the non-transition bits in the magnetic media and therefore provide different electrical indications.

The header section in the form of bit patterns, may be used for various purposes. Among such purposes is the purpose to synchronize and phase lock the servo system and read write controls with respect to the media for reading and writing operations, and to provide an indication useful in identifying a particular location or position on a moving media at which information is to re-corded or read by the transducer. The start of data mark is part of the header field. The header field may typically include in sequence, a write splice field, a phase lock field, a synchronizing field, a start of data mark or field and a data address field.

It is difficult in high density recording, to write codes comprising magnetic dibits, for example, without error, particularly a single bit error. Without defect tolerance in reading such codes, such as a start of data code, it is necessary to spare (skip over) any section or sector that contains a defect in the start of data mark. This is wasteful of data space. Also, if a dedicated servo is employed, drive timing is sufficiently inexact due to structural flexibility to cause reading errors. Thus timing shifts due to mechanical displacement between the servo head and the individual read-write or data heads, called head shift, and digital signal processor quantization errors, result in movement or displacement of the start of data mark whenever it is written. The end result is that a media surface area equal to the maximum range in which a start of data mark can be written, must be scanned and be totally defect free, in the absence of fault tolerance in the transducing system. Of course the longer the area, the higher is the probability of such a surface defect.

The longer the start of data mark, on the other hand, the easier it is to make the mark fault tolerant since there are more bit transitions to correlate. It is also desirable that the start of data mark be an integer number of bytes long (8 bits/byte), because the timing circuitry must already work in byte long increments so that no additional timing is required to access the start of data mark. A desirable goal is a start of data mark that is one byte long. In general, long start of data marks are undesirable because they increase the overhead in the header sections which reduces the user data storage capacity.

Prior art presently known to the applicant does not directly address the matters discussed above.

U.S. Pat. No. 4,740,941 entitled "System For Aligning Sector Marks With Data In A Disk Storage System", P. L. Shah et al, issued Apr. 26, 1988, describes a memory system using servo tracks and data tracks. Marks in the servo track define the sectors and marks in the data track define the beginning of data. The first sector mark in a track is an index mark. The beginning of data mark has a fixed location relative to the index mark. The read/write head is controlled to properly transduce the marks from which sector mark to data time differences for each track are determined. Fault tolerance in relation to bit defects is not addressed.

U.S. Pat. No. 4,584,616 entitled "Format For Storing Data On Magnetic Media", D. M. Allen, issued Apr. 22, 1986, describes a data track comprising in sequence, a header field, a data field and a track gap at the end of the data field. The header field contains encoded control information signalling the beginning of the data field. The track gap is a depository for spurious data from previously recorded data. The gap length is shorter than the header field to prevent its recognition as the header field. Fault tolerance in relation to bit defects is not addressed.

U.S. Pat. No. 4,297,737 entitled "Sector Servo With Sync Marks", R. Andresen et al, issued Oct. 27, 1981, employs an encoded sync signal to indicate the validity or invalidity of the servo information in that sector. Fault tolerance in relation to bit defects is not addressed.

U.S. Pat. No. 3,997,876, entitled "Apparatus and Method For Avoiding Defects In The Recording Medium Within A Peripheral Storage System", D. I. Frush, issued Dec. 14, 1976, addresses fault tolerance in relation to data by noting the location of surface defects in a disk in data recording areas and recording special codes thereat, which are recognized and disregarded as data during data reading. Fault tolerance in relation to bit defects is not addressed in this respect. The fault tolerance is directed to disk surface defects to prevent recording data on the surface defects.

Fault tolerance with respect to bit defects in the header field is needed to minimize skipping over and wasting of data space on a recording media.

SUMMARY OF THE INVENTION

A method and a means are disclosed herein in a memory system for recording on a memory media improved bit codes of minimum length and logically processing signals derived therefrom to identify the code, for the purposes of system synchronization and for identifying positions or locations on a moving recording media, while providing fault tolerance to missing, shifted or defective recorded bits.

In one of its broad aspects, this invention provides a code, in a header field of a data track on the media, recorded as a pattern of transition and non-transition bits, magnetic, magneto-optic, etc., which are transduced. The signals produced therefrom are logically combined, processed and utilized to provide fault tolerance, at least with respect to missing, misplaced or shifted individual bits, while recognizing the code as a valid code.

In another of its aspects, this invention is directed to the provision of a code defining a start of data mark in which selected bit recordings of a synchronizing field are combined with selected bit recordings of a start of data field to provide the code which defines the start of data mark, with a shortened start of data field requirement, while also achieving the synchronizing function. Again, bit signals which are transduced from these bit recordings from the two fields, are logically combined to provide fault tolerance with respect to individual bits of the fields, whereby the code is recognized as a valid code for the intended function.

The start of data field portion of the start of data mark, comprises at least three transition bits in a 16 bit code of transition and non-transition bits, and the selected part of the synchronizing field comprises at least one transition bit. This forms at least a four transition bit code. The bit signals derived from this code are stored in a detector circuit where they are simultaneously examined. The location where each of the three transition bits of the start of data field plus the alternative relationships of the two possible locations of the last transition bits of the synchronizing field are determined. Selected bit signals are logically combined to produce a plurality of signals, four signals in the best mode for practicing the invention. The four signals are combined in differing groups of three differing signals such that three of the four signals in any group must be simultaneously valid to identify the code. Thus, one bit may be missing but the start of data mark will still be identified. In these combinations of signals representing bits, transition and non-transition bits, the signals have been selectively combined in such a way that bit signal combinations from earlier transduced fields, such as the phase lock and synchronizing fields, are prevented from being mistaken as a start of data mark.

Logical provision is also made for an alternate operating mode that requires all four of the four signals to be valid, for example, to test for perfect start of data mark recording.

BRIEF DESCRIPTION OF THE DRAWINGS

The invention will be better understood by reference to the following specification when considered in conjunction with the accompanying drawings in which.

BEST MODE FOR CARRYING OUT THE INVENTION

With the need for smaller memory systems having moving memory media coupled with the need for increasing the volume of information to be stored, recording density on the media has increased significantly. As the recording density increases, the bit recording and transducing errors, referred to as bit error rate, also increase. Fault tolerance becomes increasingly important in scanning the header fields of the media to minimize sparing the following data as a result only of single bit errors in the header field code, such as in the start of data code.

Although the invention is applicable to any memory system having a moving memory media, such as a tape drive or a disk drive, the invention, as to the practice of its best mode, is described in connection with a memory file in which the moving memory media is a rotatable disk having a magnetizable surface on which magnetic dibits are recorded, as is well known.

Figure 1A:
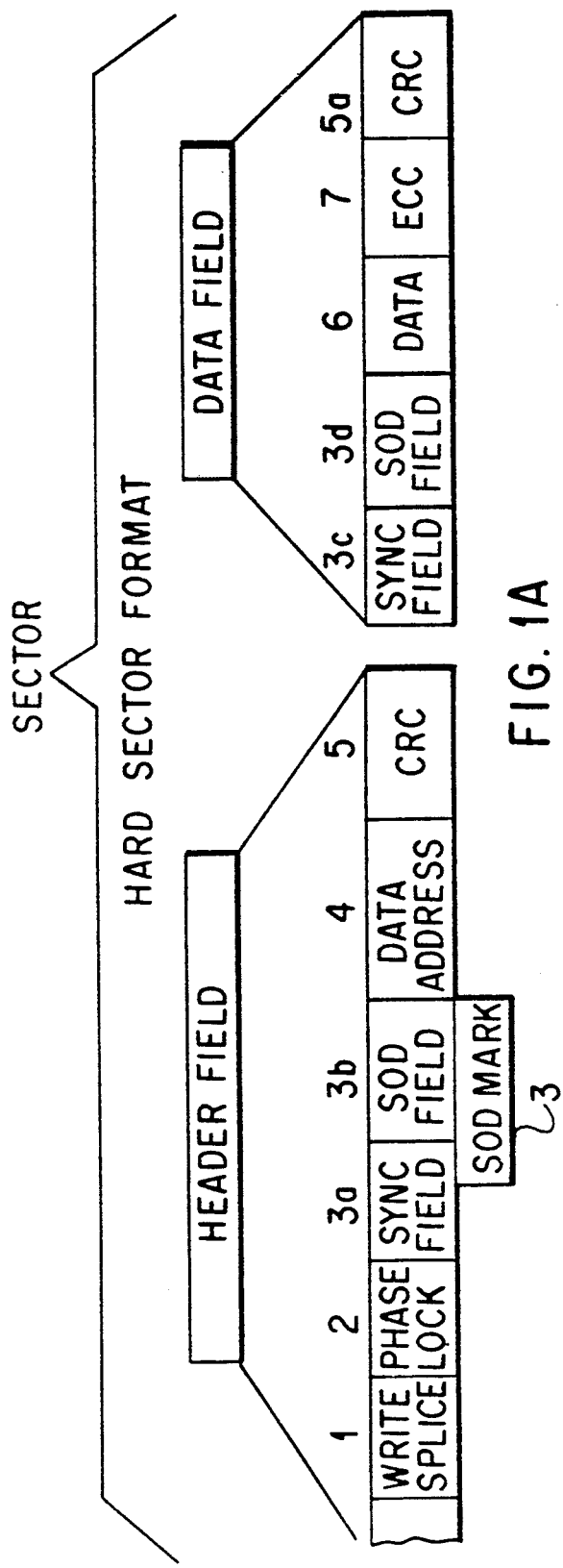
FIGS. 1A and 1B are schematic representations of two typical sectors having header fields, in a moving memory media in a memory system.
Figure 1B:
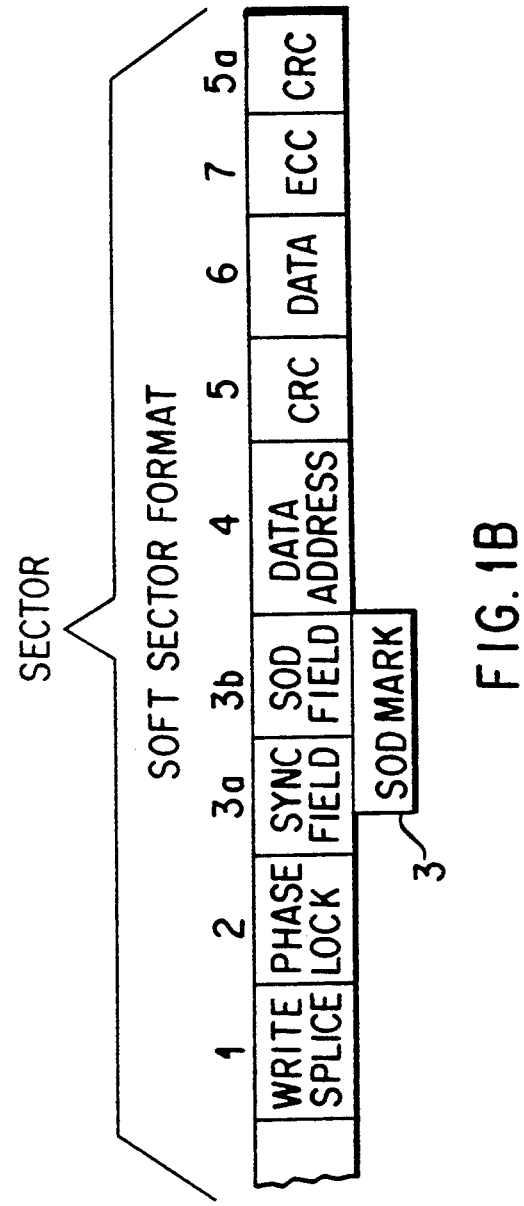

FIGS. 1A and 1B illustrate conceptualizations of two different types of conventional disk sectors, known as "hard" and "soft" sectors, respectively. These illustrations are linear representations of disk sectors which are physically of arcuate configuration when formatted in each track on a disk. These illustrations are not intended to represent all of the fields within a sector, but rather only those fields which are of interest in explaining this invention. The invention may be practiced with these and other sector formats.

In FIG. 1A, the illustrated "hard" sector comprises a header field having sections, in sequence, from left to right, comprising, a write splice field 1, a phase lock field 2, a synchronizing field 3a, a start of data field 3b, a data address field 4, and a cyclical redundancy check field (CRC) 5. A start of data mark 3 comprises the start of data field 3b and part of the synchronizing field 3a. The header field is followed by a data field within the sector comprising, a sync field 3c, a start of data field or mark 3d, the data field 6, an error correct code field (ECC) 7 and a cyclical redundancy check field (CRC) 5a.

In FIG. 1B, the separate header and data fields in the sector format of FIG. 1A are combined, which shortens the sector by eliminating the sync field 3c and the start of data mark 3d, both associated with the data field, but which has the attendant disadvantage of requiring a rewrite of the entire sector, rather than just the data field, as in FIG. 1A, when changes in the data field are to be made.

As the media moves from right to left as viewed, with respect to a transducer (not shown here) the start of data mark is detected, whereby, if the following data address is correct, the system is enabled to read data from the data field passing thereby.

Figure 2:
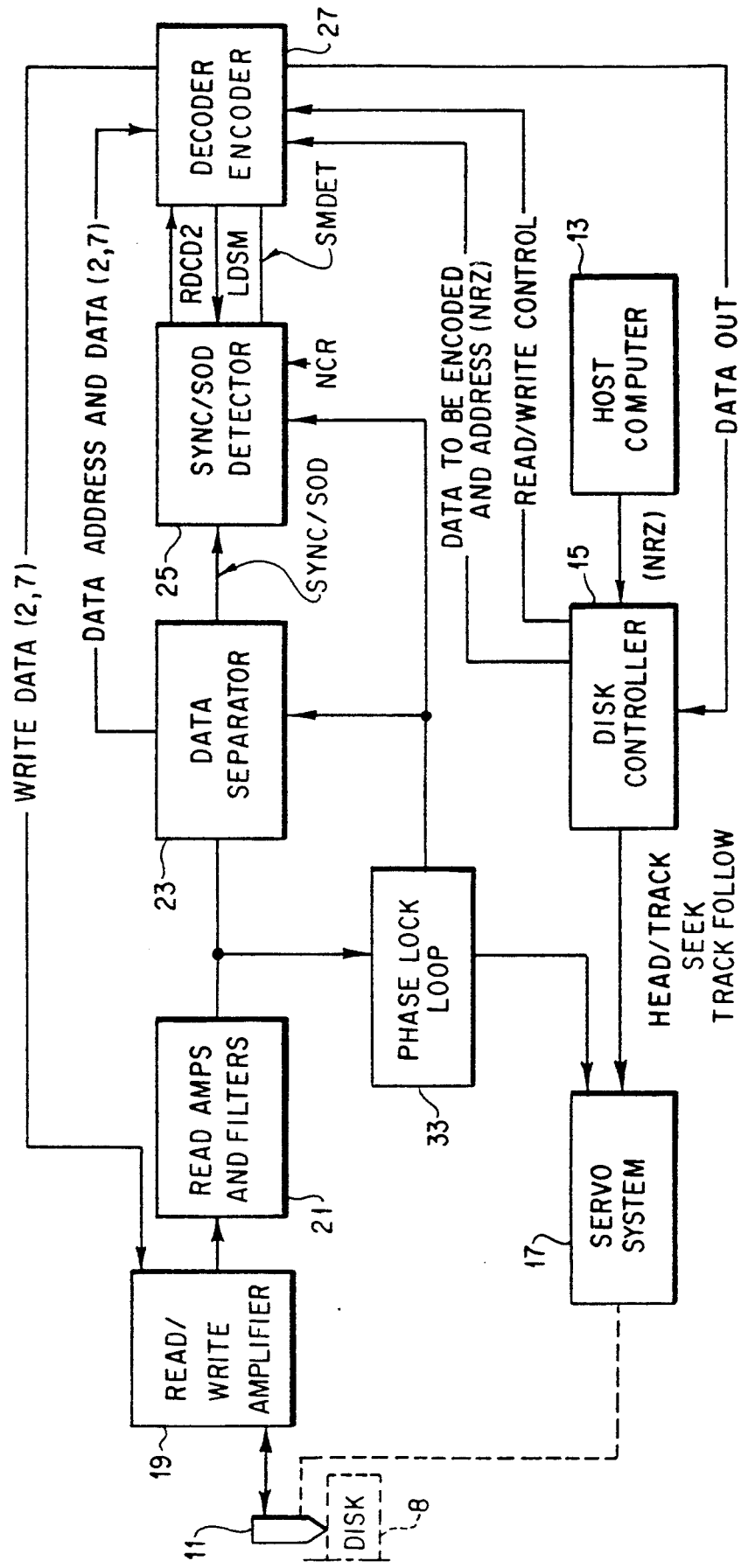
FIG. 2 is a block diagram of a disk drive system embodying the principles of this invention.

FIG. 2 is a block diagram of a typical disk drive system in which this invention is employed. A disk drive 8 is simply illustrated as comprising a single disk 9 and a single transducer or magnetic head 11. The disk drive system is part of a computer system which is under the control of a host computer 13 which requires periodic access to information stored in the disk drive. Information requests from the host computer 13 are directed to a disk controller 15, which translates that request to identify a head and a track on a particular disk. The disk controller 15 initiates operation of a servo system 17 which moves the selected magnetic head to seek the selected track and when the track is found to follow the selected track. The disk controller 15 verifies the transducer position by signaling the decoder/encoder 27 to read the next data address. If the address verifies and is part or all of the data locations desired by the host computer 13, the disk controller 13 will transmit the data to the host computer. Otherwise the controller 15 will wait until the desired data address arrives to start transferring data to the host computer 13.

The output of the magnetic head 11 is coupled via a read/write amplifier 19 to a read amplifier and filter circuit 21 where signal shaping and gain control for the servo system 17 take place. The output of the read amplifier and filter circuit 21 is coupled to a data separator 23, having also an analog-to-digital converter function. All bits read from the disk 9 are routed by the data separator 23, via the detector circuit 25, to the decoder/encoder 27. When the bit signals from the synchronizing field 3a and the start of data field 3b identify a start of data mark 3 the data address fields which follow are decoded by the decoder/encoder circuit 27 and transmitted to the disk controller 15. When the data address compares with that in the disk controller, the disk controller signals the decoder/encoder to decode the data. Data recorded at that sector address in the selected track is passed to the disk controller 15 and then to the host computer 13. This data transfer represents the information which was requested. Data to be written on the disk as encoded data is transmitted from the disk controller 15 to the decoder/encoder 27 along with the address. Write data encoded by the decoder/encoder is written when the address at the selected track is found. As seen in FIG. 2, information is transmitted between the host computer 13, the disk controller 15 and the decoder/encoder 27 in the NRZ code. Information to and from the transducer 11 is in the (2,7) code. The development of synchronizing field codes and start of data field codes is based upon this circumstance in explaining the best mode for practicing the invention. It will be appreciated that the principles of this invention may be practiced using other codes.

The phase lock field 2, as is known, comprises magnetic dibits having a repetitive constant frequency pattern. This dibit pattern in the phase lock field 2, when read by the magnetic head 11, is used by a phase lock loop control 33 to phase lock a data clock to the readback dibits. This must be done because of the variation in spindle speed, which, although only about 0.5% in one application, is very large in terms of circumferential bit transitions when compared to a single transition bit location in time, and may involve circumferential timing errors as high as 5 bit times with respect to the disk. Phase locking precedes synchronizing start of data detection.

To improve manufacturing yields and test times, it is desirable to have a start of data detection system that is fault tolerant, i.e., will stand as many single bit signal drop-ins, drop-outs and bit signal shifts as possible. Since the vast majority of recorded bit defects are only a single bit in length, a single bit fault tolerance represents a significant improvement in the reduction in data space sparing.

Current practice, with no defect tolerance, requires sparing, or skipping over, any data section preceded by a defect in the start of data mark 3. In applications where the drive timing is inexact due to using a dedicated servo, the timing shifts due to head shift and DSP quantization, result in mechanical displacements between the head and the start of data mark. The exact location of the start of data mark 3 appears to move. The end result is that an area equal to the maximum range in which start of data marks 3 can be written must be scanned and must be totally defect free, in the absence of fault tolerance. Of course, the larger the disk area of the start of data mark 3, the higher is the probability of a single bit defect.

Phase lock loop frequencies in the resonant frequency range of the magnetic heads are factors to be considered in selecting the code for dibit patterns describing the start of data mark 3 in the synchronizing field 3a and the start of data field 3b. In practicing the present invention the (2,7) code has been selected.

CODE TABLE I

| NRZ DATA | (2, 7) CODE |
|---|---|
| 00 | 1000 |
| 01 | 0100 |
| 100 | 001000 |
| 101 | 100100 |
| 111 | 000100 |
| 1100 | 00001000 |
| 1101 | 00100100 |

The encoding algorithm is to find the longest NRZ group that fits the table. Thus a sequence in NRZ code of:

"11110100" would be grouped as:
"111" "101" "00" for encoding.
In the (2,7) code this is:
"000100" "100100" "1000"

Since the synchronizing field must be a single frequency, there are two patterns of (2,7) code that are

CODE TABLE II

| | SYNC FIELD | |
|---|---|---|
| (2, 7) CODE | NRZ | NRZ$_{hex}$ |
| "3T" Pattern 100100100 ... → | 101101101 ... → | B6D |
| "4T" Pattern 1000010000 ... → | 00000000 ... → | 00 |

For the fastest lock, the pattern with the most transition bits, "1", is the best. But the NRZ pattern of the D6D$_{hex}$ requires exact write/splice signal timing (write splice field 1, sensing) relative to the data to be written. This is not compatible with dedicated servo drives because of mechanical flexibility in the magnetic head armstack structure. Furthermore, the turn on time of the write current in the write mode of operation must be accounted for.

With the 4T pattern, it is desirable that the code for that part of the start of data mark 3 in the start of data field 3a would encode to the same (2,7) pattern regardless of the number of NRZ zeros that occur traversing the synchronizing field 3a from the time the write splice field 1 is read until the first bit of the start of data field 3b is read. But write/splice signal timing is not that precise. Referring to Code Table I, assume that the first NRZ bit of the start of data field 3b is a "1". In NRZ code, it will be the first "1" transition that the decoder-/encoder 27, FIG. 2, will see when writing, since the NRZ synchronizing field, Code Table II, is all NRZ zeros.

CODE TABLE III

For even numbers of NRZ zeros before the first bit of the start of data field 3b, the sequence is as follows:

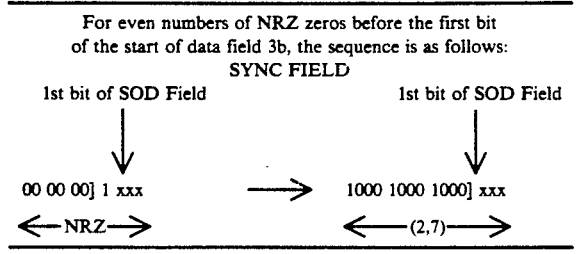

For odd numbers of NRZ zeros before the first bit of the start of data field 3b, the sequence is as follows:

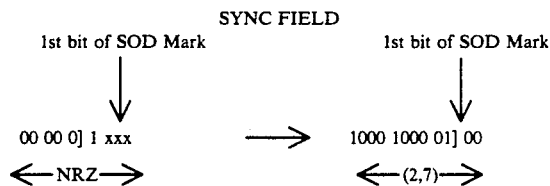

In order for the bit pattern of the start of data field 3b to be encoded from the NRZ code into the same (2,7) bit pattern regardless of an odd or even number of zeros proceeding this start of data field 3b, it is necessary that the first two bits of the start of data field 3b in the (2,7) code be 00. From Code Table IV below, it is seen that there are only four bit patterns that meet this criteria, i.e.:

CODE TABLE IV

| NRZ CODE | (2, 7) CODE |
|---|---|
| 100 | 00100 |
| 111 | 000100 |
| 1100 | 00001000 |
| 1101 | 00100100 |

From this table the NRZ number 1101 encodes into the maximum number of "1" transitions in the (2,7) code, which is highly desirable since it makes correlation easier. Also it is important to note that 101 (NRZ) = 100100 (2,7) so that this bit pattern of the NRZ code encodes into the same bit pattern in the (2,7) code regardless of the number of NRZ code zeros.

But the bit pattern of the NRZ code (1101) is only one half byte (4 bits) long and a bit pattern which is an integer byte in length is desired. Another requirement is that the bit pattern of the start of data field 3b be the same regardless of the data which follows it. This requires another one half byte pattern so that the following data will not affect it. The only choices are the bit patterns from another NRZ code, 1101 ($D_{hex}$), or from another NRZ code, 1100 ($C_{hex}$). The $D_{hex}$ bit pattern has more transitions, which is desirable, but because the preceding bit pattern is also a $D_{hex}$ bit pattern there is difficulty in making a correlation that can accommodate one bit faults. By combining the bit patterns of the $D_{hex}$ and $C_{hex}$ codes, a $DC_{hex}$ bit pattern for a start of data mark is obtained providing correlations that can accommodate one bit faults. The bit pattern of the synchronizing field 3a and the bit pattern of the start of data field 3b in the (2,7) code are as follows:

CODE TABLE V (2,7 Code)

For even numbers of zeros preceding the start of data field

←SYNC FIELD→|←START OF DATA FIELD→
1000 1000 1000 | 0010 0100 0000 1000

←————START OF DATA (SOD) MARK————→

Odd numbers of zeros preceding the start of data field

←SYNC FIELD→|←START OF DATA FIELD→
0010 0010 0001 | 0010 0100 0000 1000

←————START OF DATA (SOD) MARK————→

There are only three transitions "1's" pattern of a $DC_{hex}$ (2,7) code, start of data field bit pattern. To allow a one bit drop out or fault, requires bit fault detection on just two transitions in this situation. But this results in a high probability of falsely detecting a one bit drop-in or bit shift. More transitions for correlation are needed to meet the goal of one bit fault tolerance.

One alternative is to lengthen the start of data mark 3. This is undesirable since it lengthens the encode/decode delays which must be accounted for in the gap sizes, in addition to reducing data recording space.

Another, presently preferred alternative, is to make use of transitions in the adjacent synchronizing field 3a as part of the start of data mark 3. This can be done without interfering with the synchronizing function. There is a problem, however, in this approach, in that the synchronizing field transition in the (2,7) code next to the start of data field 3b, is in a different location depending upon whether there are an odd or even number of NRZ code zeros (Code Table III) between sensing of the write splice field 1, to enable writing, and sensing of the start of data mark 3.

Figure 3A:
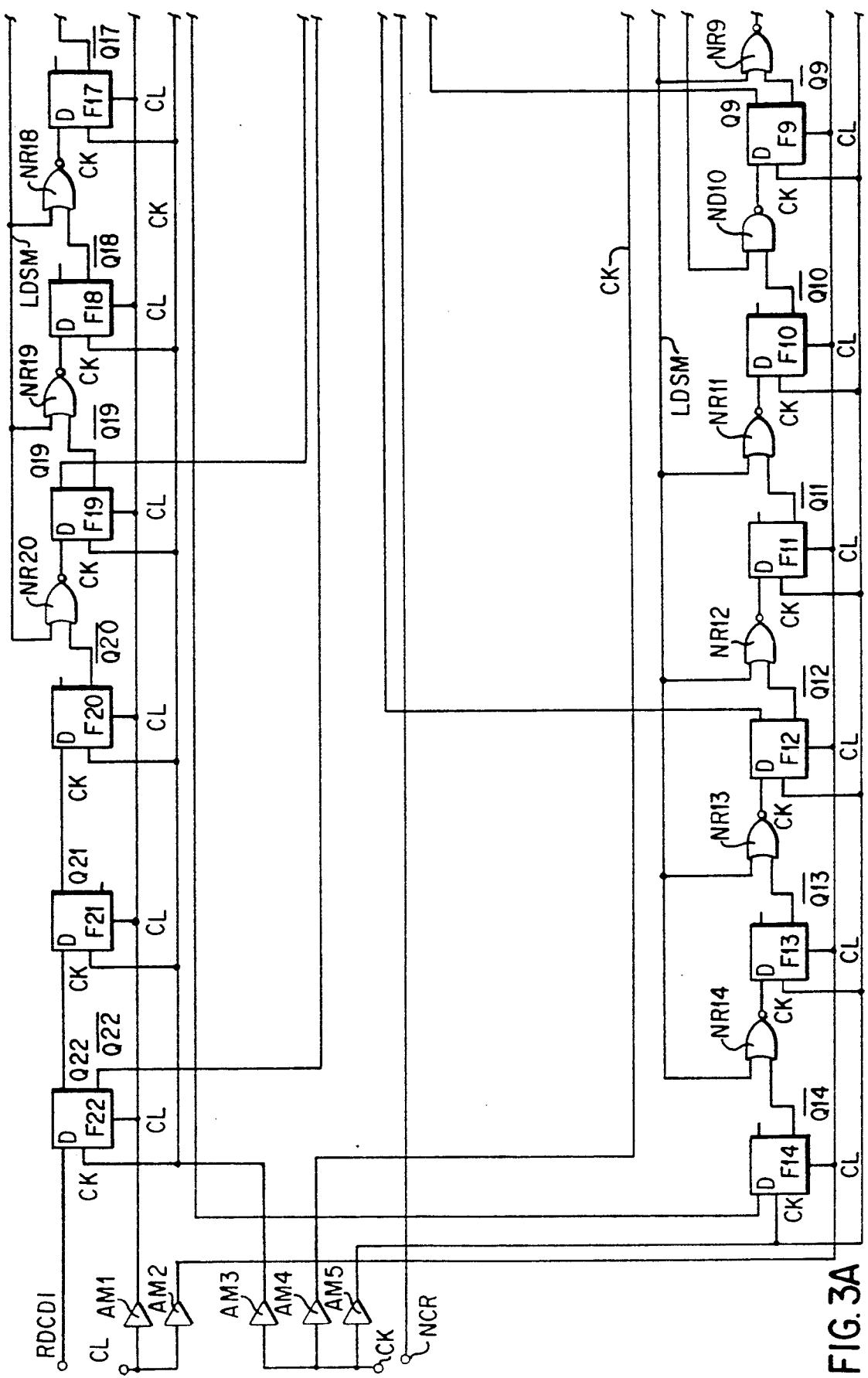
FIGS. 3A and 3B illustrate some detail aspects of a detector circuit of FIG. 2, and FIGS. 4A and 4B are tables illustrating signal sources and their logical organization in explanation of the detector circuit of FIGS. 3A and 3B.
Figure 3B:
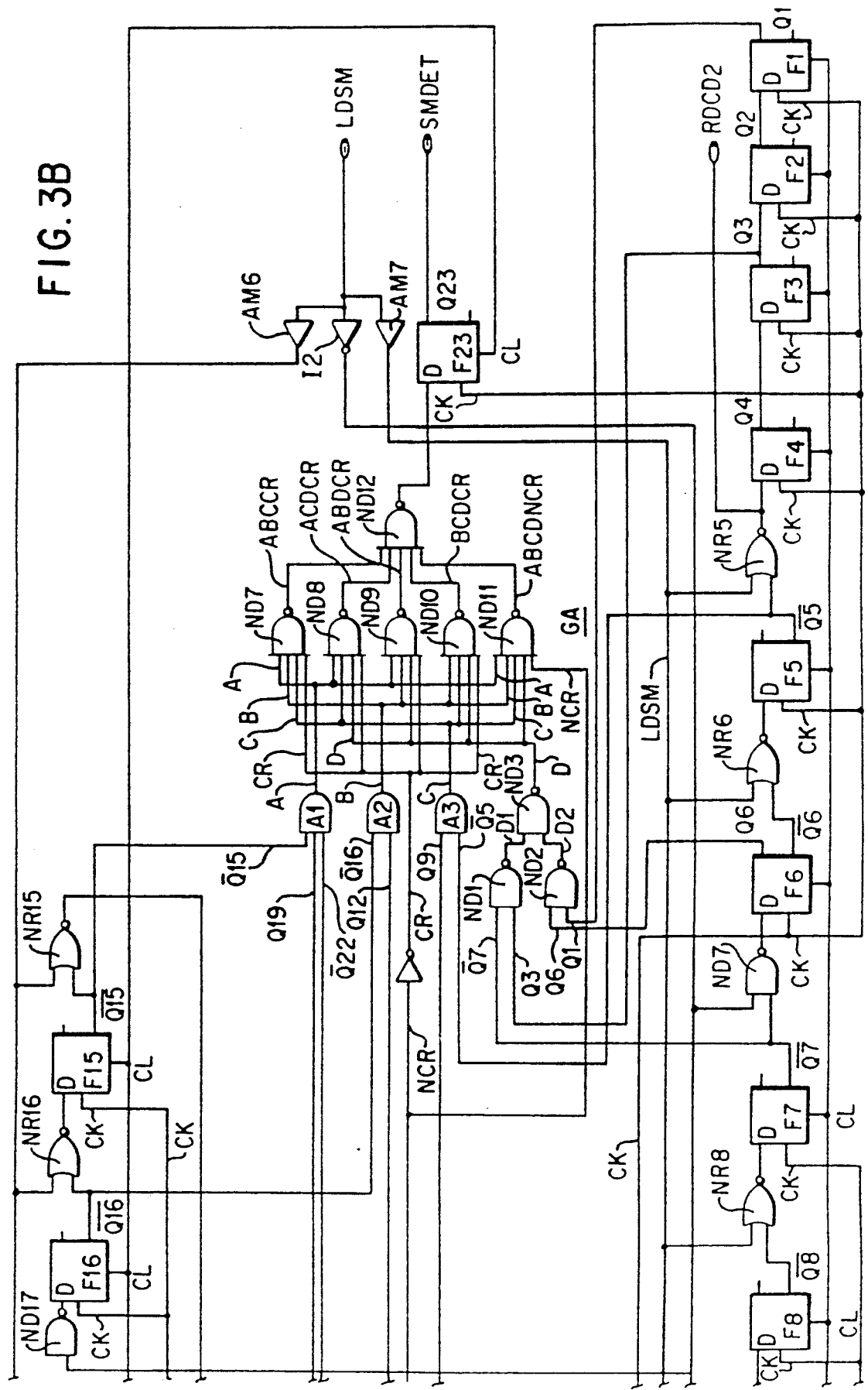

This problem is uniquely solved, as seen in FIGS. 3A and 3B. Here the serial (2,7) code being read from the disk is shifted into a long shift register in the detector 25, having a 22 bit storage capacity in individual flip-flops F1-F22. When the bit signal shift into the shift register is completed, all of the bit signals (flip-flop electrical states) can be simultaneously examined. The logical correlation of the flip-flop bit signals to achieve the one, or single, bit fault tolerance will be examined in detail. Generally stated, the location where each of the three transitions of the start of data mark, plus an OR relationship of the two possible locations of the last transition of the synchronizing field, are combined such that three (3) of these four (4) transitions must be valid. Additionally, there has been AND'd with each transition, one or two other bit locations that contain non-transition bits, i.e., a zero "0". This prevents the earlier synchronizing field transitions from being mistaken as start of data field transitions.

Code Table VI below when construed with FIGS. 3A and 3B and FIGS. 4A and 4B, depicts the logical concept.

CODE TABLE VI

(2,7) Code

| |←——— SYNC FIELD ———→|←————— START OF DATA FIELD —————→| |
|---|---|---|---|
| | (3a) | (3b) | |

EVEN ZEROS  F1 F2 F3 F4 F5 F6 | F7 F8 F9 F10 F11 F12 F13 F14 F15 F16 F17 F18 F19 F20 F21 F22

1 0 0 0 1 0    0 0 1 0 0 0 | 0 0 1 0 0 1 0 0 0 0 0 0 1 0 0 0

Q3 $\overline{Q5}$        | $\overline{Q7}$   Q9      Q12     $\overline{Q15}$ $\overline{Q16}$     Q19       $\overline{Q22}$

|←——————————————— SOD MARK ———————————————→|
(3)

ODD ZEROS  F1 F2 F3 F4 F5 F6 | F7 F8 F9 F10 F11 F12 F13 F14 F15 F16 F17 F18 F19 F20 F21 F22

0 0 1 0 0 0    1 0 0 0 0 1 | 0 0 1 0 0 1 0 0 0 0 0 0 1 0 0 0

Q1         $\overline{Q5}$ Q6     |      Q9      Q12     $\overline{Q15}$ $\overline{Q16}$     Q19       $\overline{Q22}$

|←——————————————— SOD MARK ———————————————→|
(3)

---

The flip-flops F1-F22 of FIGS. 3A and 3B are identified with each bit of the synchronizing field 3a and each bit of the start of data field 3b employed in start of data detection. The last 22 bits of the combined fields of 28 bits are used for start of data detection.

It is unknown if there are an odd number of zeros or an even number of zeros in the synchronizing mark as recorded in the sync field 3a. Thus there are two different twenty eight (28) bit plots of bit patterns in the (2,7) code, one for an even number of zeros and one for an odd number of zeros in the synchronizing field 3a. Both start of data bit patterns 3b are the same. In Code Table VI, the bits are grouped in seven groups of four comprising both the synchronizing field and the start of data field. This grouping of the twenty eight (28) dibits is for explanation purposes only and is not to be construed as representing the group patterns of bits recorded on the disk. Twenty two (22) of the twenty eight (28) bits in the (2,7) code are employed. Sixteen (16) bits comprise the start of data field 3b which is identical for both even and odd (2,7) code configurations in the synchronizing field 3a. The remaining six (6) bits, are the last bits from the synchronizing field 3a.

In FIGS. 3A and 3B, the NOR gates NR5, NR6, NR8, NR9, NR11-NR16 and NR18-NR20, and the NAND gates ND7, ND10 and ND17, connect correspondingly numbered flip-flops to the next flip-flop in the register.

Each NOR gate has two inputs and a single output. Functionally when both inputs are in the lower of their two voltage states, the output of the NOR gate is high. When either or both NOR gate inputs are in the higher of their two voltage states, the output of the NOR gate is in the lower of the two voltage states.

Each NAND gate has two inputs and one output. Functionally when either or both of the inputs of the NAND gates are in the lower of their two voltage states, the output of the NAND gate is in the higher of its two voltages states. The $\overline{Q}$ output terminals of the flip-flops comprise one input to each NOR gate and one input to each NAND gate.

A load start of data mark signal, LDSM, is connected to the remaining input terminals of each NOR gate, in divided circuits, via the amplifiers AM6 and AM7. An inertor amplifier I2 inverts the signal LDSM which is then connected to the remaining input of each of the NAND gates ND7, ND10 and ND17. The load start of data mark signal, LDSM, has two voltage states, a lower voltage state when inactive and a higher voltage state to effect loading of the start of data mark, LDSM, in the shift register upon the occurrence of a clock pulse.

The flip-flops F1-F22 are D-type flip-flops, which are clocked by clock pulses CK distributed in parallel among the flip-flops at their clock pulse terminals via amplifiers AM3, AM4 and AM5. By these circuit connections, the clock pulses are simultaneously applied to all flip-flops. The flip-flops are set true or false simultaneously by the clock pulses CK depending upon the voltage level at each of their Dinput terminals. As used herein, "true" or "false" represent the "1" or "0" electrical states, respectively, of the flip-flops, as referred to the flip-flop outputs, Q. The $\overline{Q}$ output is always the opposite state of the Q output and is used when a negated signal results in logic simplification. A flip-flop is in its "1" representing electrical state when the output terminal Q is in the higher of its two voltage states and is in its "0" representing electrical state when the output terminal Q is in the lower of its two voltage states. A clear signal CL, applied simultaneously to the CLEAR input terminal of each flip-flop, sets the Q output of each of the flip-flops in its "0" representing electrical state and the $\overline{Q}$output in its "1" electrical state.

The register is cleared before code reading from the disk takes place. When the bit recordings of the synchronizing and the start of data fields, 3a and 3b, are read from the disk 9 they are read from left to right as viewed in Code Table VI and in FIGS. 4A and 4B and entered serially into the shift register at a read code input terminal RDCD1 connected to the input terminal D of the flip-flop F22. All of the bits of the synchronizing code 3a and the bits of the start of data code 3b are read or transduced and the signal bits therefrom are stepped through the register stages synchronously with and by the clock pulses CK until the last start of data signal bit (bit 28) is entered at the flip-flop F22.

Figure 4A:
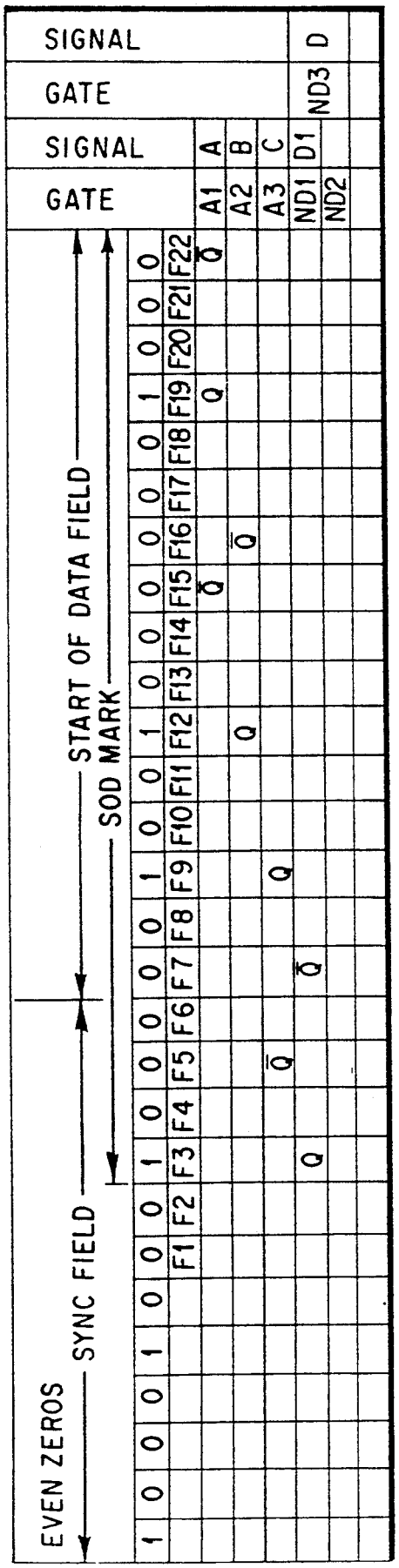
Figure 4B:
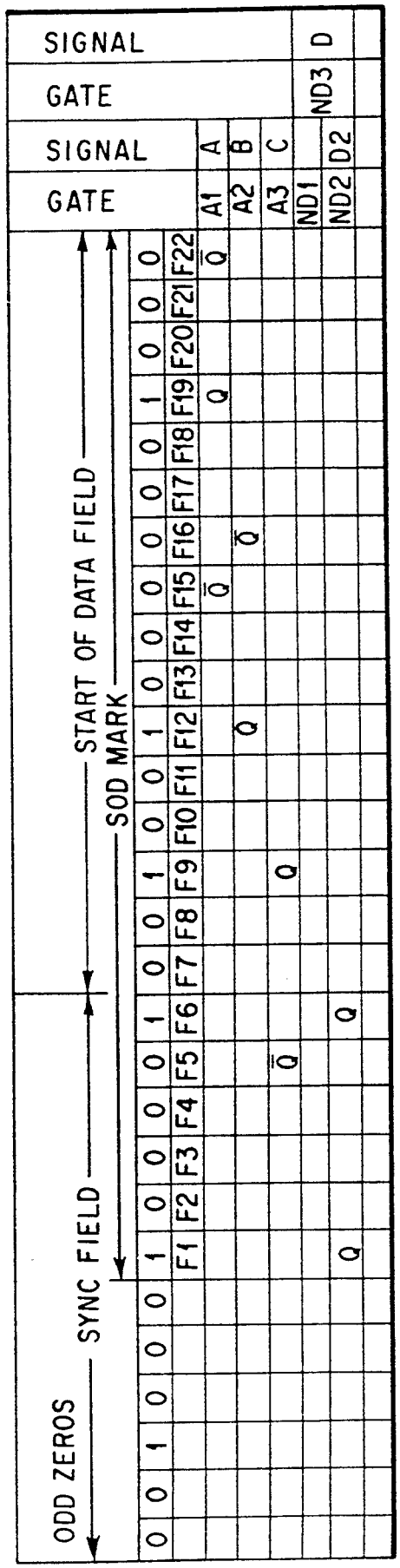

The logic circuit for indicating the detection of a start of data mark is illustrated in the logical gate array GA in FIG. 3b. The logical organization is seen in FIGS. 4A and 4B. AND gates A1, A2 and A3 receive as inputs, groups of selected flip-flop signals. Each AND gate in response to the simultaneous existence of each signal in a group produces a single output signal, respectively signals A, B and C, herein called single signals. Since two different synchronizing codes exist and the transition bits thereof are in different bit positions, provision is made in the shift register in flip-flops F1-F6 to provide separate flip-flops in which to store the bit signals derived therefrom. As seen in FIGS. 4A and 4B, NAND gates ND1 and ND2, respectively, receive the transition bits signals from the even zero and odd zero synchronizing fields, respectively, producing respective output signals D1 and D2. Either signal, D1 or D2, when low enables a NAND gate ND3 to produce an output signal D, also called a single signal D. The gate logic is defined as follows:

| Gate A1 | $\overline{Q15}$ · Q19 · $\overline{Q22}$ | = A |
| Gate A2 | Q12 · $\overline{Q16}$ | = B |
| Gate A3 | $\overline{Q5}$ · Q9 | = C |
| Gate ND1 | Q3 · $\overline{Q7}$ | = D1 |
| Gate ND2 | Q1 · Q6 | = D2 |
| Gate ND3 | D1 + D2 | = D |

This aspect of the gate logic is designed to obviate the false detection of a start of data field when bit fields preceding the start of data bit field are being scanned, as will be explained. Four NAND gates ND7 to ND10 each have three different signal groups from the four single signals A, B, C, D. These signal groups are ABC, ACD, ABD and BCD for the respective gates ND7 to ND10. When all three signals in any group are simultaneously high, that is, valid, this indicates that a start of data mark has been found. A fourth input signal CR on each of these gates, in the fault tolerant functional mode, is always high. The signal CR is derived from a signal NCR which is part of an error checking and correction circuit to be explained. When the correction check is not in progress the correction signal NCR is low. An invertor amplifier I2 inverts this signal producing the output signal CR in the higher of its two voltage states to enable the gates ND7-ND10 for the fault tolerant start of data mark detection function. A fifth NAND gate ND11 in this NAND gate array is employed to check a start of data mark on the disk for accuracy. All signals A, B, C, D are coupled to this gate so that in the error checking mode there may be no errors in the recorded bits of the start of data mark. Error checking is accomplished by switching the signal NCR to the higher of its two voltage states. The output signal CR of the amplifier I2 in that circumstance is in the lower voltage state which disables the NAND gates ND7 to ND10. The signal NCR which is coupled directly to the NAND gate ND11, which in the fault tolerant start of data mark detection mode disabled that gate, is now an enabling signal. The other gates, ND7-ND10, being disabled, now leaves only the gate ND11 as an active element in the error checking, start of data mark detection mode of operation. The error checking, start of data mark detection function now requires that all transition bits in the recorded start of data mark be in place and be detected.

The output of this gate array GA is at a NAND gate ND12, having as its inputs the outputs of all of the gates ND7-ND11. The start of data mark detection condition at any gate ND7-ND11 in which all input signals at a gate are in their high voltage state, places the output of that gate, of the gates ND7-ND11, in the lower of its voltage states. The output of the NAND gate ND12 is high when any one input thereat from the gates ND7-ND11 is in the lower of its voltage states, indicating that a start of data mark has been detected. The output of the NAND gate ND12 is coupled to the input terminal D of a flip-flop F23. The output Q23 of which, in its high voltage state, signals the detection of a start of data mark 3 which is indicated by a signal SMDET.

As discussed in connection with Code Table VI and as seen in FIGS. 4A and 4B, the signals resulting from the transducing of the transition and the non-transition bits of the synchronizing code 3a and the start of data code 3b are combined in a way that obviates the mistaken identification of dibit arrays, such as in the synchronizing field 3a, other than the precise start of data dibit array, for a start of data mark 3. This is accomplished by combining non-transition signal bits with transition signal bits in logical signal patterns that can not be duplicated during scanning of bit fields ahead of the start of data field 3a. These logical combinations are therefore configured with knowledge of such preceding bit field configurations. The combinations which are implemented in FIGS. 3A and 3B and explained as to logic in FIGS. 4A and 4B are exemplary and demonstrate the principle, and while unique, do not represent the only useful, or only logical, solution to achieving a unique start of data mark identity.

Referring to the circuits of FIGS. 3A, 3B and the signal table of FIGS. 4A and 4B, the single signal A is developed by combining in an AND relationship the output bit signals $\overline{Q15}$, Q19 and $\overline{Q22}$ from the correspondingly numbered flip-flops on the input circuits in an AND gate A1.

The single signal B is developed in the output of an AND gate A2 having as its inputs the output bit signals Q12 and $\overline{Q16}$ from the flip-flops F12 and F16.

The single signal C is developed in the output of an AND gate A3, having as its inputs the output bit signals $\overline{Q5}$ and Q9 from the flip-flops F5 and F9.

The single signal D is developed from the output of a NAND gate ND3 having as its input the output signal D1 of a NAND gate ND1 or the output signal D2 of a NAND gate ND2. The bit signals Q3 the flip-flops F3 and F7 comprise the input to the NAND gate ND1. The bit signals Q1 and Q6 of the flip-flops F1 and F6 comprise the inputs to the NAND gate ND2. By this circuit connection either the even or the odd zero bit configurations of the synchronizing bit field 3a are represented in the signals D1 and D2, respectively. Thus the single signal D resulting from bit signals from either the even synchronizing bit code or the odd synchronizing bit code is combined in the logic of the start of data mark detection circuits.

In FIGS. 4A and 4B, the signals "1" or "0", of the synchronizing and the start of data fields 3a and 3b, respectively, are numbered 1-28 and the bit signal numbers are related to the flip-flops F1-F22 of the shift register of the detector circuit 25, for that condition in which the last bit 28, of the start of data code is loaded in the last register flip-flop, flip-flop 22. This is the condition in which all of the bit signals which define the start of data mark 3, from the start of data field 3a and the synchronizing field 3b are loaded in the flip-flops of the shift register. The gates A1, A2, A3, ND1 and ND2, together with their input signals Q, $\overline{Q}$ from the indicated flip-flops and their respective output signals, the single signals A, B, C, D1 and D2, are in respective rows so that the flip-flop inputs to the respective gates are easily identified. Thus, for example, the inputs to the AND gate A1 are Q15, Q19 and Q22. These signals exist simultaneously when bit signals "0"(21), "1"(25) and "0"(28) are at the Q outputs of the flip-flops F15, F19 and F22. Similar considerations apply to the signals for the remaining gates. The signal D exists when either of the signals D1 or D2 exists. These signals do not exist simultaneously since they depend upon the formatting of the synchronizing field 3a, even zeros, FIG. 4A, or odd zeros, FIG. 4B. The implementation of the gates ND1, ND2 and ND3, as seen in FIG. 3B is logically depicted in FIGS. 4A and 4B where the output D1 of the gate ND1, FIG. 4A, at the input of gate ND3 results in the production of the signal D. Similarly the signal D2, FIG. 4B, at the input of gate ND3 produces the single signal D.

The selective derivation of the signal groups for the respective gates from the different flip-flops obviates the mistaken identification of a start of data mark, for example, as the bit signal stream from the bits 1-28 propagates through the register, bits "0"(14), "1"(18) and "0"(21) produce an enabling ($\overline{Q}$, Q, $\overline{Q}$) signal pattern at the input to the AND gate A1 and the single signal A is produced. However the single signals B, C and D are not produced at this time, since the bit signal groups "0"(11) and "1"(15), flip-flops F12 and F16, gate A2, bit signals "0"(4) and "0"(8), flip-flops F5 and F9, gate A3 and bit signals "0"(2) and "0"(6), flip-flops F3 and F7, gate ND1, are non enabling. Similar considerations apply with respect to the intermittent occurrence of single signals B, C and D during signal propagation in the register before the entire start of data mark 3 is loaded.

As seen in FIG. 2, one output, a start of data mark detection signal, SMDET, of the detector circuit 25 is coupled as input to the decoder/encoder 27. The shift register of FIGS. 3A and 3B, which comprises part of the detector circuit 25, produces the signal SMDET which indicates the start of data mark is detected. The signal SMDET is coupled to the decoder/encoder 27.

During the recording of start of data marks by the decoder/encoder or during maintenance, it is desirable to check the start of data marks for accuracy. When the correction signal NCR is in the higher of its two voltage states, only the gate ND11 is enabled, requiring the presence of all start of data mark bits and their bit signals in proper positions. This feature provides for the detection of defective start of data marks. If a start of data mark is correct, then the system is guaranteed to handle single bit defects in reading, such as those resulting from noise or being slightly off track, for example. Three clock pulse times are required to load a SOD mark. One to read the SOD mark detect flip-flop F23. One to apply the load SOD mark signal LDSM in the register. Thus, for synchronism, the SOD mark when loaded is displaced three stages in the register. If a start of data mark is defective in this error checking mode, signal SMDET is in its lower voltage state, indicating a start of data mark 3 is not found. The decoder/encoder 27, FIG. 2 produces a signal LDSM and then on the next clock pulse the start of data mark 3 is loaded. Since three clock pulse intervals are involved the loaded start of data mark is placed three flip-flop positions along in the register to maintain synchronization.

In greater detail, when the signal LDSM is applied, the NOR gates in the flip-flop chain couple low voltage state signals to the input terminals D of succeeding flip-flops. The NAND gates in the flip-flop chain couple high voltage state signals to the input terminals D of succeeding flip-flops. With the next occurring clock pulse, the start of data mark exists in the shift register.

Referring to Code Table VI and to FIGS. 4A and 4B, it is seen that since three clock pulse intervals have elapsed, the flip-flops F6, F9 and F16 are to be set to their "1" representing electrical states and the remaining flip-flops to their "0" representing electrical states when the clock pulse following the application of the signal LDSM is applied, to load the start of data mark in the register. To this end, the NAND gates ND7, ND10 and ND17 are coupled in the register circuit to the inputs of the named flip-flops, respectively. The shift register is cleared, setting all flip-flops to their zero, "0", representing electrical states. When the signal LDSM is applied, both inputs to all NOR gates are high. The output of each NOR gate is then low. The invertor amplifier I2 couples a low input signal to one input of each NAND gate and the output of each NAND gate is then high. A clock pulse at that time correspondingly sets the flip-flops which now load the start of data mark, shifted three bit times (clock pulse times) in the shift register.

The encoded mark, RDCD2, is then shifted into the encoder/decoder 27 which decodes the corrected SOD mark and sends it to the disk controller 15 (FIG. 2). With completion of the correction, the correction signal NCR is turned off so that the following data will not be overwritten.

In the event a start of data mark is defective in a way to escape detection, in the read mode of operation, a data pattern Which follows may be mistaken for a late start of data mark. The normal way to protect against this mistaken identity is to employ a time out counter. Where there are timing uncertainties, however, reliance is placed upon the lack of the proper cyclical redundancy check, CRC, verification and/or a lack of data.

Although the invention has been described in connection with start of data mark detection in a disk drive, using a specific logical concept, using specific mixes of positive and negative signal logic, using specific flip-flops, gates and amplifiers and using NRZ and (2,7) codes, it will apparent to those skilled in the art that the invention may be practiced in any memory system having a moving recording media in which provision is made for detecting and/or examining recorded and coded bit patterns by processing bit signals in external circuits, in which provision is made for logically processing differing subcombinations of the bit signals from differing bit signal groups derived from the encoded bit patterns, for control use or correction purposes.

I claim:

1. In a memory file having a movable memory media with a bit code recorded in a track thereon, a method for detecting said bit code, comprising the steps of:
    producing electrical bit signals by scanning the bits of said bit code in sequence;
    storing said bit signals in the sequence in which the bits are scanned;
    logically combining at least two stored bit signals from differing bit positions in differing bit signal combinations;
    producing a single binary signal from each differing bit signal combination when the bit signals of that bit signal combination are in a predetermined binary state, logically combining different single signals, fewer in number than the total number of single signals, in differing single signal groups; and utilizing the simultaneous existence, in a predetermined binary state of all single signals which are combined in any one group to indicate detection of said code.

2. The method according to claim 1, in which:

the step of logically combining at least two bit signals comprises combining at least two bit signals in four differing bit signal combinations.

3. The method according to claim 1, in which:

the step of logically combining different single signals fewer in number than the total number of single signals comprises combining single signals, one less in number than the total number of single signals.

4. The method according to claim 1, in which:

the step of combining at least two bit signals comprises combining bit signals in four different bit signal combinations, and the step of logically combining different single signals comprises combining three different single signals in each single signal group.

* * * * *